United States Patent
Bogdanowicz et al.

(10) Patent No.: US 7,167,280 B2
(45) Date of Patent: Jan. 23, 2007

(54) FULL CONTENT FILM SCANNING ON A FILM TO DATA TRANSFER DEVICE

(75) Inventors: Mitchell J. Bogdanowicz, Spencerport, NY (US); Christian Lurin, Arcadia, CA (US); Kyle J. Alvut, Henrietta, NY (US)

(73) Assignee: Eastman Kodak Company, Rochester, NY (US)

(*) Notice: Subject to any disclaimer, the term of this patent is extended or adjusted under 35 U.S.C. 154(b) by 1012 days.

(21) Appl. No.: 10/040,219

(22) Filed: Oct. 29, 2001

(65) Prior Publication Data

US 2003/0081117 A1 May 1, 2003

(51) Int. Cl.
*H04N 1/00* (2006.01)
*H04N 3/36* (2006.01)

(52) U.S. Cl. ............... 358/406; 358/487; 358/504; 358/506; 358/296; 348/97

(58) Field of Classification Search ............... 358/487, 358/506, 296, 504, 406, 1.6, 484, 474, 312, 358/318, 319, 487.506, 3.23, 1.9; 702/107; 348/96, 97; 399/9; 355/40; 382/312, 318, 382/319
See application file for complete search history.

(56) References Cited

U.S. PATENT DOCUMENTS

| | | | |
|---|---|---|---|
| 5,045,932 A | 9/1991 | Sharman et al. | 358/527 |
| 5,387,929 A | 2/1995 | Collier | 348/97 |
| 5,828,461 A | 10/1998 | Kubo et al. | 358/296 |
| 6,081,343 A | 6/2000 | Terashita | 358/1.9 |
| 6,297,873 B1 | 10/2001 | Furuya | 355/40 |
| 6,442,497 B1 * | 8/2002 | Houston et al. | 702/107 |

FOREIGN PATENT DOCUMENTS

| | | |
|---|---|---|
| EP | 0 961 482 A2 | 12/1999 |
| WO | WO 97/09821 | 3/1997 |

OTHER PUBLICATIONS

"Digital Film Scanning and Recording: The Technology and Pratice" by Glenn Kennel. 8012 SMPTE Journal, 103 (Mar. 1994), No. 3, White Plains, NY, US.

(Continued)

*Primary Examiner*—Cheukfan Lee
(74) *Attorney, Agent, or Firm*—Stephan H. Shaw

(57) ABSTRACT

A method of transferring an image recorded on a photographic film to a digital signal, using a film scanning device that generates scan data representative of the digital signal, comprises the steps of calibrating the film scanning device in relation to printing densities and scanning the photographic film with the film scanning device to produce scan data that represents printing densities. Inasmuch as the digital signal is used to drive a film recorder that exposes an output film that is subsequently printed onto a target print material, the scan data represents printing densities which when written out to the film recorder will produce printing densities of the output film onto the target print material that are identical to the printing densities of the same photographic film optically transferred onto the target print material.

13 Claims, 5 Drawing Sheets

OTHER PUBLICATIONS

"Gray-Scale Transformations of Digital Film Data for Display, Conversion, and Film Recording" by Glenn Kennel and David Snider. 8012 SMPTE Journal, 102(Dec. 1993), No. 12, White Plains, NY US.

U.S. Appl. No. 10/045,829, filed Oct. 29, 2001, Robert J. Cirulli et al.

Engineering Handbook, E.O. Fritts, Ed., 8th edition, National Association of Broadcasters, 1992, Chapter 5.8, pp. 933-946.

* cited by examiner

FULL CONTENT FILM SCANNING ON A FILM TO DATA TRANSFER DEVICE

CROSS-REFERENCE TO RELATED APPLICATION(S)

Reference is made to commonly assigned copending application Ser. No. 10/045,829, entitled "Calibration of a Telecine Transfer Device for a Best Light Video Setup" and filed on even date herewith in the names of R. J. Cirulli, K. J. Alvut and M. M. Mendel.

FIELD OF THE INVENTION

The invention relates generally to improvements in the field of film scanning, and in particular to improvements in the transfer of motion picture film to a digital signal that is especially adapted for film recording.

BACKGROUND OF THE INVENTION

As generally shown in FIG. 1, in the motion picture industry an original motion picture negative film is exposed during a camera exposure operation 10, developed into a processed camera negative 12 and subsequently processed in one of several ways. In the motion picture industry, there are two common subsequent processes: an optical printing process 18 and a film scanning process 20. It is well known that the optical printing process may be practiced in several ways in order to optically transfer the image data to a print material. In a single stage optical process, the optical transfer is direct; that is, the color negative film 12 is optically printed onto another photosensitive material, e.g., a release print material 22 such as Eastman Color Print Film 5386™, to produce a color positive image suitable for projection. To avoid harming the original negative in the subsequent processes, the camera negative 12 may be converted into an interpositive 14, which is a positive image optically produced on a negative copying material with the same contrast and the same extended range of the scene as the camera negative. (Either element 12 or 14 then constitutes the photographic film element 16 identified in FIG. 1, which is subsequently processed.) In such a multi-stage process, the optical transfer of the original image data to a print material is indirect; that is, the interpositive 14 is used to optically produce numerous duplicate negatives 24, which are then optically printed (process 26) onto release prints 28, which may also be Eastman Color Print Film 5386™.

In the other subsequent process in the motion picture industry, the color negative film information (camera negative 12) or the color print film information (interpositive 14) is transferred into a video signal using a telecine transfer device in the telecine scanning process 20. (As with the optical scanning process, the interpositive is a negative copying material that is used to produce a positive with the same contrast as the original negative and the same extended range of the scene; this element is then used in the trade as the element to scan on the telecine device without risking harm to the original negative.) Various types of telecine transfer devices are described in *Engineering Handbook*, E. O. Fritts, Ed., 8*th* edition, National Association of Broadcasters, 1992, Chapter 5.8, pp. 933–946, the disclosure of which is incorporated by reference. The most popular of such devices generally employ either a flying spot scanner using photomultiplier tube detectors, or arrays of charged-coupled devices, also called CCD sensors. CCD sensors include either an area array scanner (captures the full frame at once) or a linear line scanner (the film is transported across a line array of sensors and the total image is then a reconstruction of all the lines to give an area image). Telecine devices scan each negative or positive film frame transforming the transmittance at each pixel of an image into a voltage. The signal processing then inverts the electrical signal in the case of a transfer made from a negative film in order to render a positive image. The signal is carefully amplified and modulated, and fed into a cathode ray tube monitor 30 to display the image, and/or recorded onto magnetic tape for storage in a recording stage 32. The output of the telecine scanning process 20 may be applied to a film recording stage 34, which produces a negative film 36 that can be optically printed out as a release print.

The monitor 30 is typically a high definition (HD) monitor with the data provided from the telecine scanning process 20 incorporating the characteristics of the monitor such that the video image is pleasing to the operator. In this use of the telecine transfer device, only a restricted range of the total image on the film element 16 is used (i.e., compressed into the tonal range of the monitor). If a video tape is desired from the video recording process 32, the data associated with the image displayed on the monitor is written to digital (or analog) tape. If digital data is required for the subsequent film writing process 34, the telecine device has an output data pathway which includes one dimensional look up tables (1D LUTs) 38 that transform a video tone scale to a more film like tone scale such that the resulting negative 36 produced will print onto a photographic print element 28 and look at least somewhat like a film system image. The video monitor image, however, usually will not match the final print image in tone scale and color reproduction.

In the previous examples from the prior art, the digital data acquired in the telecine scanning process 20 only has the restricted range of the initial video range capture. If the client desires changes to the final look, the operator can only modify the data obtained. If there was information on the photographic film element 16 outside of the range initially captured, then it is not represented in the data and cannot be used. An example of this could be an interior scene with a person sitting at a desk with an outside window in the background. In a normal telecine transfer, the very high exposure of the outside window relative to the proper lightness of the interior foreground will show up as a very light area without much detail. However, the film element has considerable detail in this area but without advanced technical techniques it cannot be displayed on the HD monitor. The extended range can be captured in a second scan through the telecine scanning process 20 with a different setup that maximizes the high exposure area. The two scans can then be merged with advanced digital techniques. One drawback of this technique is that the extended range that needs to be captured must be known at the time of the original scan, otherwise a future new scan is required with added cost. Moreover, while the desired transfer would capture the entire extended range of the negative, in the current system the HD monitor would be unable to effect correct tone scale and color reproduction and thus would be useless as a creative display device.

In the motion picture trade, some postproduction facilities use a technique that tries to capture the complete negative range. In this technique, the highest density on the negative is assigned to the highest video level and the lowest density on the negative is assigned to a low video level (usually not the full low to high range available in the bit depth of the transfer). This data can then be color corrected on another device, which inputs data and allows digital manipulation to give an image on a monitor that is pleasing to the client. In either case another device, usually another computer system, is employed in an attempt to show a film look from the data to validate the image content before committing to film recording.

In current telecine transfer practice, there is no assurance that the data will render on film (by means of a film recorder) as intended. The dynamic range on the negative is not preserved in a consistent manner. Moreover, the current telecine transfer practice of viewing the scanned video data on a HD monitor and then writing to data (and film) through a 1D LUT can produce changes in the very low tones (blacks and very dark colors) in the data that are not able to be displayed on the monitor.

For a effective film recording process, what is ultimately needed is a telecine transfer process that produces data that can be used, without operator intervention, as input to a film-recording device to produce a negative, which will result in a print that matches a print optically produced from the original negative.

SUMMARY OF THE INVENTION

The present invention is directed to overcoming one or more of the problems set forth above. Briefly summarized, according to one aspect of the present invention, a method of transferring an image recorded on a photographic film to a digital signal, using a film scanning device that generates scan data representative of the digital signal, comprises the steps of calibrating the film scanning device in relation to printing densities and scanning the photographic film with the film scanning device to produce scan data that represents printing densities. Inasmuch as the digital signal is used to drive a film recorder that exposes an output film that is subsequently printed onto a target print material, the scan data represents printing densities which when written out to the film recorder will produce printing densities of the output film onto the target print material that are identical to the printing densities of the same photographic film optically transferred onto the target print material.

The present invention thus refers to a method of capturing the full content of a photographic element on a telecine scanning device. By capturing the full content of a photographic element, the advantage is that the resulting data can be used as input to a film-recording device without operator intervention to produce a negative, which will result in a print that matches a print from the original negative. In this way, the need for color grading on a scene-to-scene basis during the film scanning process is avoided. Thus, the time involved in the initial scan is significantly reduced and the complete representation of the scene is available for post-production data-to-data manipulation. The postproduction data-to-data manipulation is usually a computer disk-to-disk operation, and in this case the full range of the scanned film element is available in one scan to achieve the desired look of the creative person directing the color transformation.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
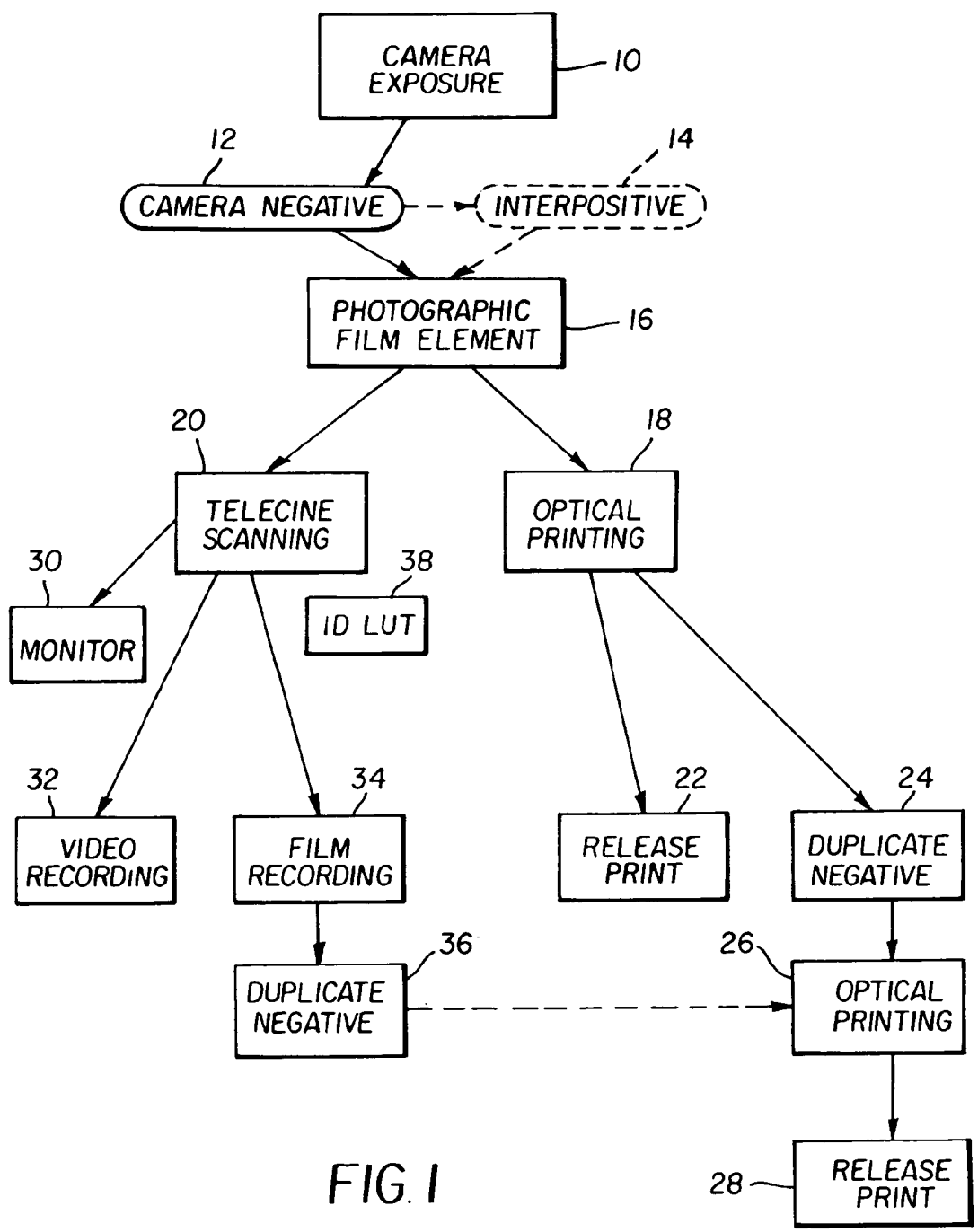
FIG. 1 is a block diagram of the motion picture postproduction process, as known in the prior art, which is useful in forming an understanding of the invention.

Because telecine and other film scanning devices employing cathode ray tubes (CRTs) or electronic sensors are well known, the present description will be directed in particular to elements forming part of, or cooperating more directly with, the calibration technique in accordance with the present invention. Elements not specifically shown or described herein may be selected from those known in the art.

The data generally used in the trade for film recording is a 10-bit log format. This is not just a mathematical logarithm but also a precise 10-bit digital representation of the negative's printing density. The term "printing density" is a reference to a density metric similar to the industry standard Status-M density. In this discussion both Status-M and printing density will refer to three integral red, green and blue channels. In a density metric there is a conversion of linear transmittance to log (density) by the equation:

$$\text{Integral Density} = -\text{Log (Integral Transmittance)}.$$

The Integral Transmittance metric is a measure of the degree that an element alters the effective intensity of a light source. The mathematical computation of the integral transmittance of a photographic element such as a color negative is dependant on the spectral transmittance curve (transmittance at predefined wavelength increments, i.e., 10 nm) of the element to be measured as well as the spectral power distribution of the light source and the spectral sensitivity of the detecting device. For example, the red integral Status-M transmittance is the sum of the wavelength-by-wavelength products of the spectral transmittance of the film element and the normalized spectral power distribution of the light source and the normalized red spectral sensitivity of the Status-M detecting device. Similarly, the red integral printing density transmittance is the sum of the wavelength-by-wavelength products of the spectral transmittance of the film element and the normalized spectral power distribution of the printing light source (motion picture film printer light source spectral distribution) and the normalized red spectral sensitivity of the print film spectral sensitivity. The green and blue channels are calculated in similar fashion. Thus, a Status-M density is a standard traceable to a standards reference document. However, a printing density is really a density representation as to how the photographic print element "sees" the dyes of the film element and predicts the independent red, green and blue channel attenuation in the printing process. It is clear that for any specific Status-M density of a particular film element there is an infinite number of sets of printing densities that depend on the printer lamp house and the characteristics of the print material.

The 10-bit log format also provides for a scaling. A code value (CV), from a range of 0 to 1023 (10 bit=1024 states), represents 0.002 in printing density. Therefore, the complete 10-bit range of code values represents 2.046 in printing density. This 2.046 printing density range corresponds to a scene exposure range of approximately 3.72 log exposure (approx. 12.4 stops) for a film with a gamma of 0.55. A hypothetical film with a gamma of 0.5115 with a log exposure range of 4.0 (approx. 13.33 stops) could also be expressed in the complete code value range.

This invention centers about the idea, in terms of FIG. 1, that with a specific calibration to printing density, the telecine device can accurately capture the information on the film element 16 in such a way that the resulting code values represent true printing densities which when written out to a properly calibrated film recorder 34 will produce printing densities of the output film 36 onto the target print material 28 that are identical to the printing densities of the same film element 16 optically printed onto the target print material 22 (or 28). Thus, in the end, a print 28 optically produced from the recorder-generated negative 36 via the telecine scanning process 20 will match, in tone scale and color reproduction, the print 22 (and 28) optically produced from the original film element 16 via the optical printing process 18 (and 26).

Figure 2:
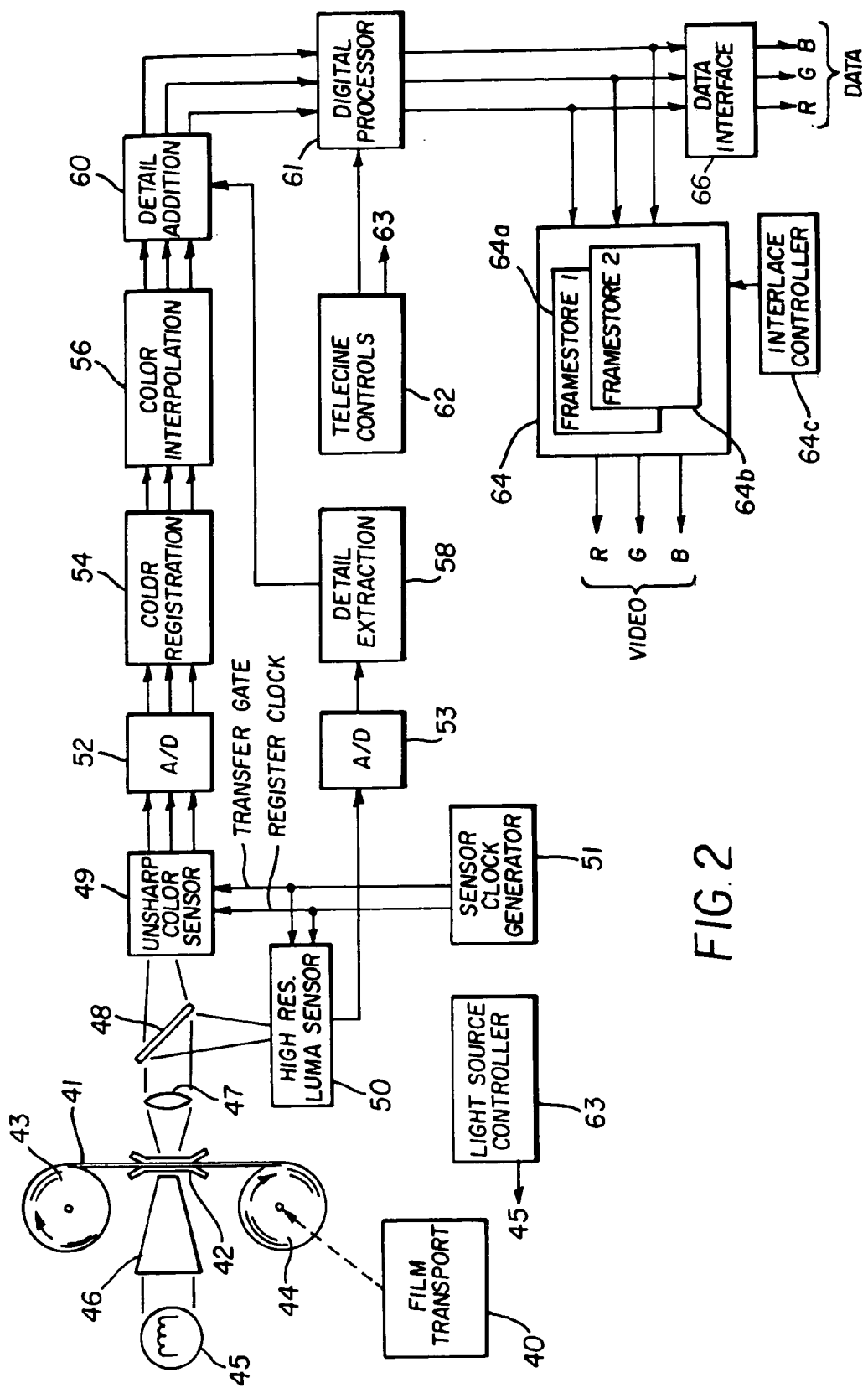
FIG. 2 is a block diagram of a telecine transfer device that may be calibrated in accordance with the invention to provide calibrated code values for a film writing process.

Referring to FIG. 2, which shows a telecine transfer device in more detail, a film transport 40 advances a motion picture film 41 at a substantially uniform speed through a film gate 42 from a supply reel 43 to a take up reel 44. A light source 45 generates a light beam that is directed through a circle to line converter 46 and focused upon a linear section of the film 41 in the film gate 42. The light is modulated by the image in the film 41 and transmitted through an objective lens 47 to a beam splitter 48, which transmits one portion of the light to an unsharp color sensor 49 and reflects the other portion to a high resolution luminance sensor 50. The color sensor 49 comprises three linear color arrays respectively sensitive to red, green and blue light. The luminance sensor 50 includes a linear array sensitized to light having a spectral composition approximating a luminance function. A sensor clock generator 51 provides a clock signal of appropriate frequency(s) for shifting the respective image signals from the output registers of the color sensor 49 and the luminance sensor 50.

The luminance sensor 50 produces a full resolution signal according to the requirements of the high definition standard, or the film scanning standard, in use. Low resolution, or unsharp, color is provided from the color arrays comprising the color sensor 49, allowing the color photosites to be accordingly larger, which has the advantageous effect of increasing the signal-to-noise performance. The unsharp color sensor 49 provides three channels of color data to an analog-to-digital converter 52 and the luminance sensor 50 provides a high resolution data stream to another analog-to-digital converter 53. Because the three color arrays comprising the color sensor 49 are spaced in the direction of film motion, the fixed mis-registration of their output signals is corrected in color registration circuit 54. Since the digital color values represent lower resolution data than the digital luminance values, additional color values are generated in a color interpolation circuit 56 in both the horizontal and vertical directions. Meanwhile, high frequency detail is extracted from the luminance data by a detail extraction circuit 58 and added to each channel of color in an addition circuit 60, forming thereafter a full resolution, three channel, high definition color output signal. This high definition signal is applied to a digital processor 61, which can apply adjustments to the high resolution signal as determined from a telecine control section 62. A colorist would operate the telecine controls 62 to adjust the lift (dark areas), gain (highlights) and gamma (mid-tone) of the images produced by the high resolution signal. The control section 62 also includes an adjustment for the light level of the light source, which is communicated to a light source controller 63.

The full resolution, three channel, high definition color output signal from the digital processor 61 is further processed either as a video output through an image store 64 or as a data output through a data interface 66. The image store 64 includes a first framestore 64*a*, a second framestore 64*b* and an interlace controller 64*c* for loading the high resolution data into one framestore while extracting high resolution video fields in interlace format from the other framestore. The output of the image store 64 can be applied, referring to FIG. 1, to the monitor 30, after suitable adjustments for transfer characteristics by means of look-up tables (LUTs), or to a digital (or analog) video recording stage 32. The full content film scan data output from the data interface 66 may go to DVD, CD, VHS, an HD master, film output, and the like. For instance, as shown without limitation in the preferred embodiment, the data output from the data interface 66 is applied to the film recording stage 34. (In this case, the 1D LUTs 38 would not be used.) Further details of the telecine and its operation can be found in commonly-assigned U.S. Pat. No. 5,045,932, "Method and Apparatus for Generating a High Definition Electronic Signal from a Line Scan of a Color Signal", which is incorporated herein by reference.

Figure 5:
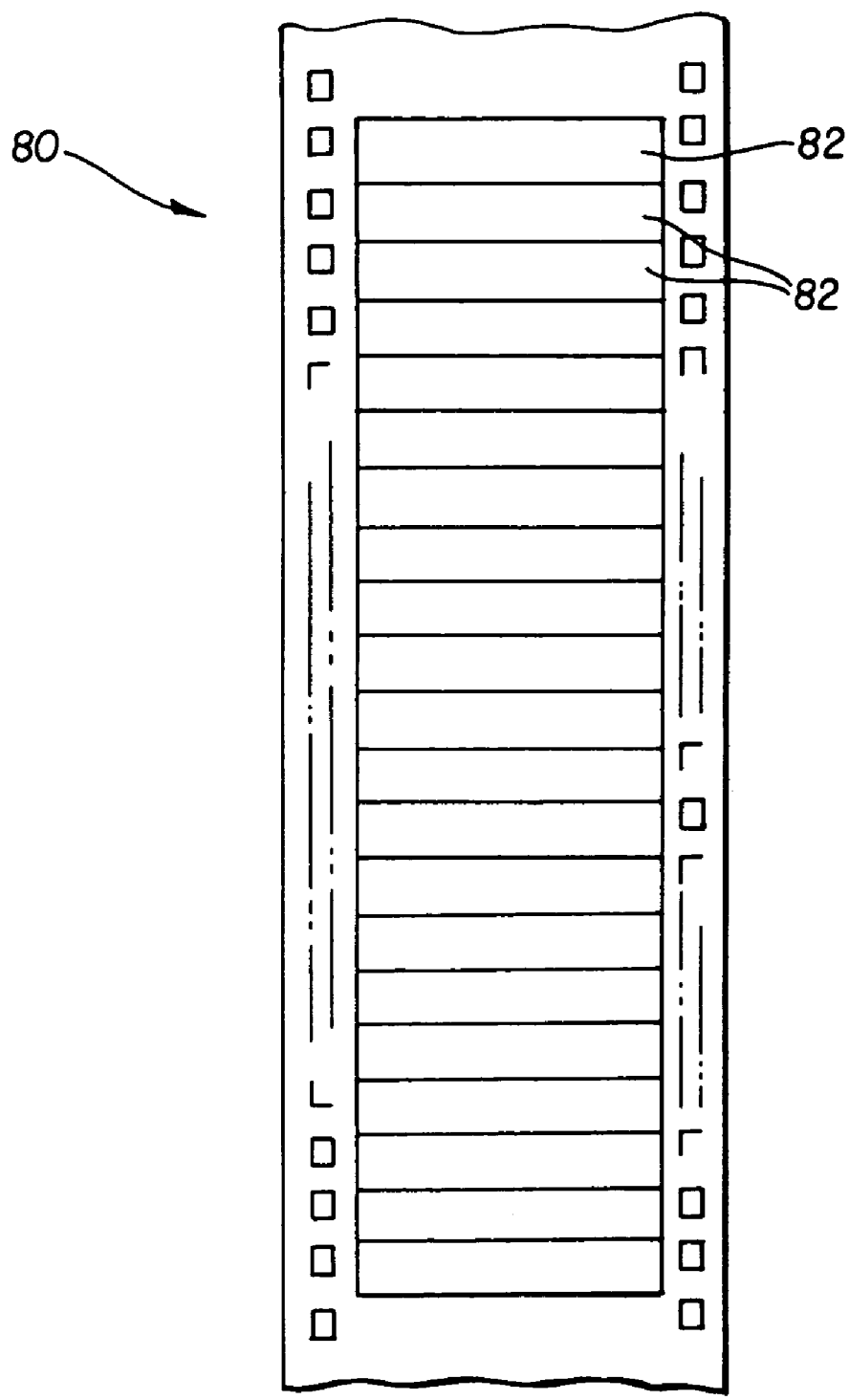
FIG. 5 is a diagram of a calibration element useful in the calculations and calibration processes shown in FIGS. 3 and 4.

During calibration of the telecine, a calibration film element 80 (as shown in FIG. 5) is manually run through the film gate and scanned. In practice, the actual, specific calibration of the telecine for a variety of filmstocks would use a plurality of calibration film elements, wherein each film element is used to calibrate the system for an accurate extended range printing density scan of a given film having given density-log exposure characteristics (one film element can be used for each set of films with similar characteristic curves). The specific characteristic of the calibration film element 80 is a neutral exposure onto the film element with the light balanced for the color temperature of the design criterion, e.g., whether designed for daylight vs. tungsten, of the film element. This is ordinarily done by a series of exposures on a sensitometer, although a camera could be used to obtain the patches by a series of uniform exposures in which the aperture and shutter speed are varied in an ordered manner. In the preferred embodiment, the exposure range is chosen from a standard set, in this case a 0–4.0 Log Exposure range (approx. 13.33 Stops) which on a film with a gamma of 0.55 reflects a printing density range of 2.20 which is slightly outside of the 2.046 printing density range of the 10-bit log format. As shown in FIG. 5, the calibration film element 80 ordinarily includes a plurality of neutral patches ordered into a set, e.g., from light to dark; for instance, as specifically shown in FIG. 5, the calibration film element 80 includes twenty-one patches 82 ordered at 0.2 log exposure increments for the 0–0.4 log exposure range. (The arrangement in FIG. 5 is shown without limitation, i.e., a greater or fewer number of patches may be used, their sizes and separation may vary, and they need not be in ascending (or descending) order of density. Moreover, the movement of the calibration element through the telecine film gate could be automatic, rather than manual.)

In an alternative to the preferred embodiment, the exposure range may be encoded in a greater bit depth; for example, if a 12-bit log format were adopted (0–4095 CV) and the current 0.002 printing density to CV scaling applied, then a printing density range of 8.19 could be accommodated. If, instead, the printing density to CV scaling was 0.001, then a printing density range of 4.095 could be accommodated. This would capture a 7.45 log exposure range on a gamma 0.55 film (24.8 Stops), far greater than is required for even advanced imaging. However, the current limitation of available technology is the linear bit depth of capture, which is 12-bits and which correlates well with the 10-bit Log format. When a greater linear bit depth of capture is available, at least 14-bits linear and preferably 16-bits linear would fit well with the 12-bit log format.

Figure 3:
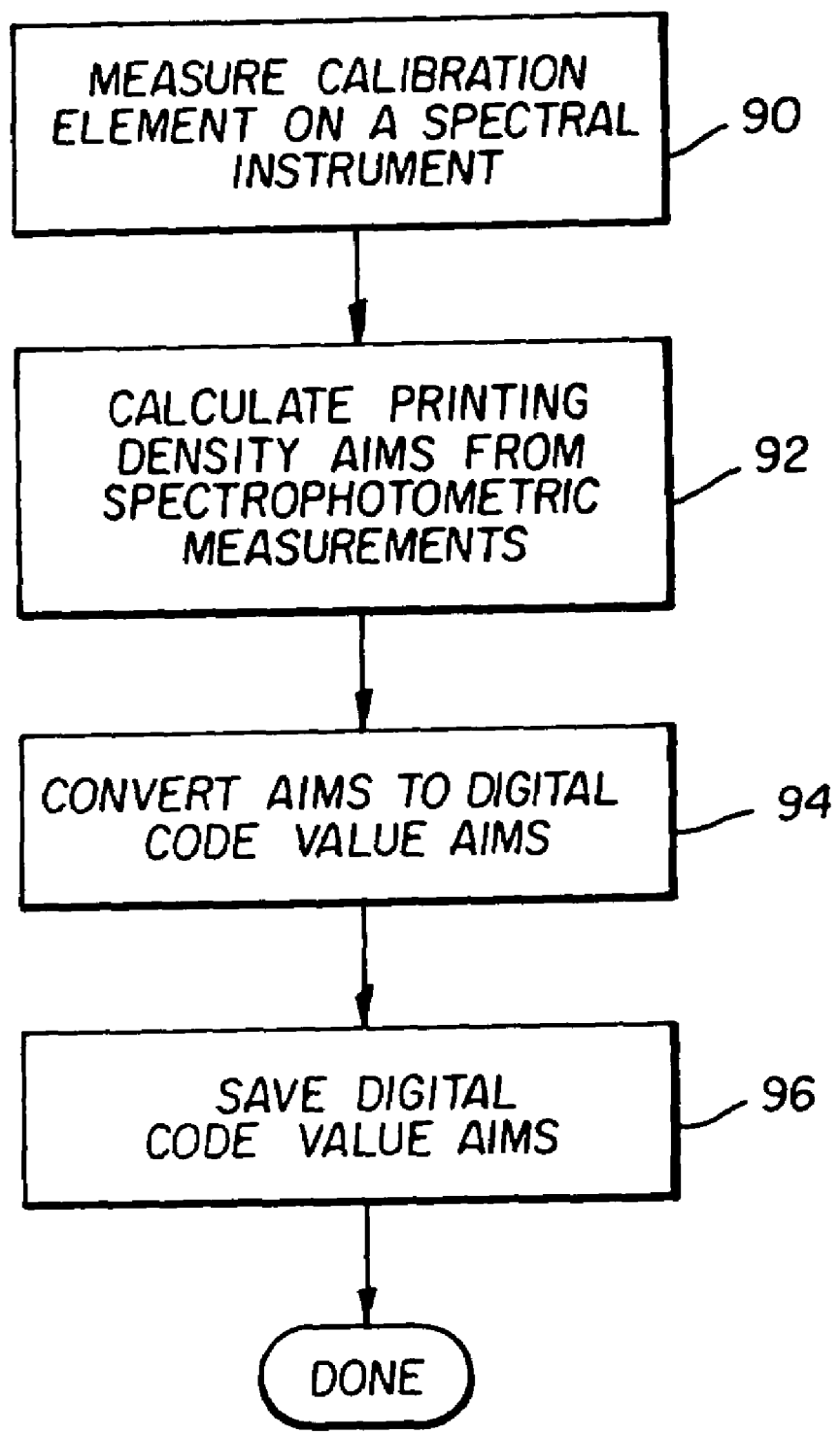
FIG. 3 is a flow chart showing the calculation of digital code value aims.

FIG. 3 shows the steps involved in generating the digital code value aims that are used in the calibration process. Initially, in a measurement step 90, the calibration film element 80 described above is measured on a spectral instrument to determine the spectral transmittance curves for each of the patches of the calibration element (e.g., for the 0–4.0 Log Exposure calibration film element 80 shown in FIG. 5 the usual exposure increment is 0.20 Log Exposure for a total of 21 patches). The obtained measurements are applied to a printing density aim calculation step 92 where the data is used as described above to calculate the printing density aims for the calibration, basically by summing, for each color, the wavelength-by-wavelength products of the spectral transmittance of the film element, the normalized spectral power distribution of the printing light source and the normalized spectral sensitivity of the print film spectral sensitivity. Then, in a conversion step 94, the printing density aims are converted to digital code value aims by, e.g., dividing through by 0.02 to obtain code values. In a storage step 96, the digital code value aims are stored in a storage associated with the digital processor 61 (FIG. 2).

Figure 4:
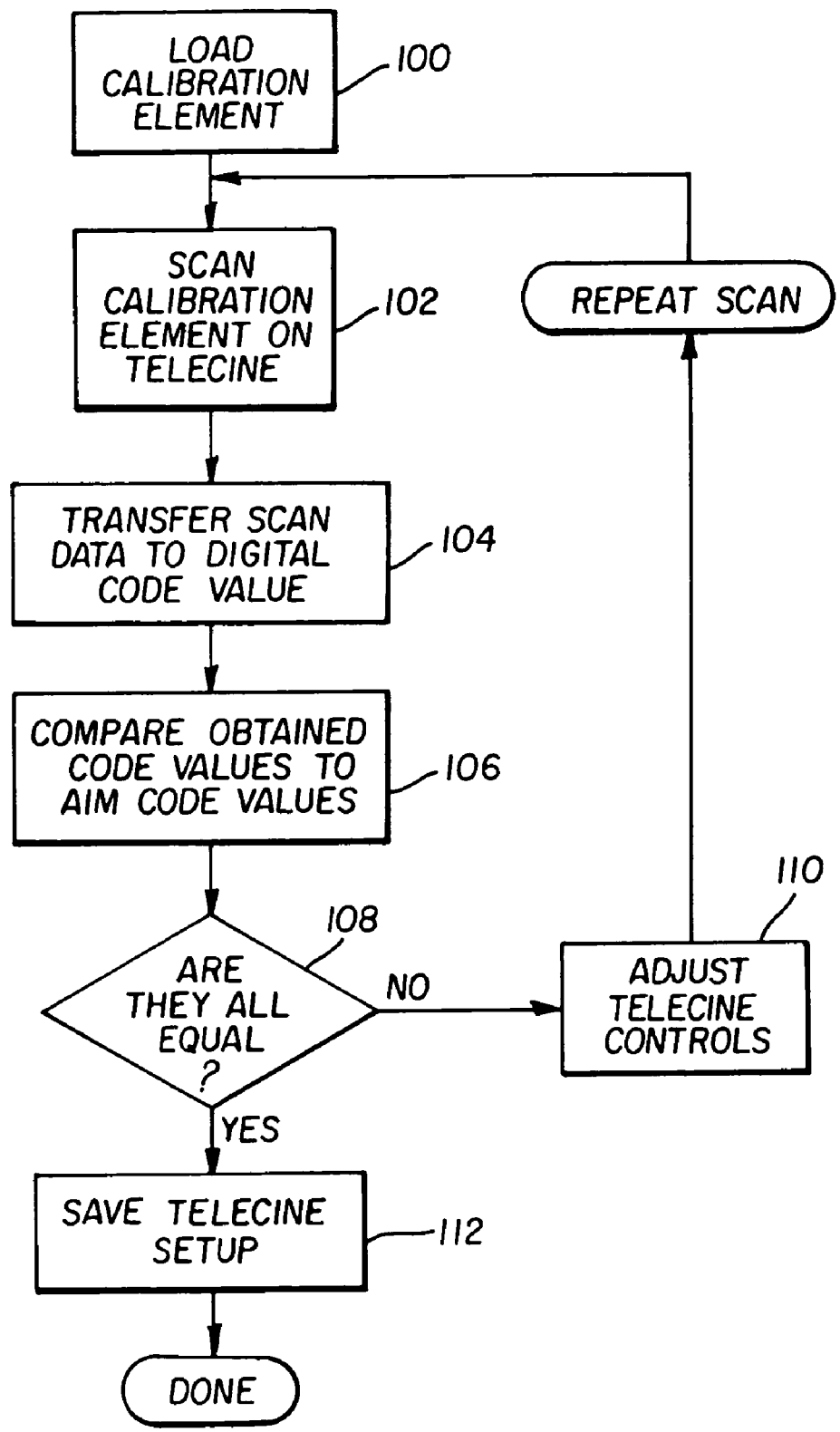
FIG. 4 is a flow chart of the calibration process according to the invention, which uses the digital code value aims calculated in FIG. 3 to calibrate the telecine shown in FIG. 2.

FIG. 4 shows the steps involved in calibrating the telecine to the digital code value aims that were generated in the preliminary steps shown in FIG. 3. Before beginning the calibration process as shown in FIG. 4, the telecine device is first set into its center TAF (from Eastman Kodak Company's Telecine Analysis Film) setup mode. The TAF setting is a well-understood industry standard that is used to center the controls of a telecine device, and it sets the starting tone scale and color position to the TAF reference chart. Then, the calibration film element 80 is loaded onto the telecine device in a loading step 100. In a scanning step 102, the calibration film element 80 is scanned on the telecine and the scan data is saved. This scan data is then transferred into digital code values in a transfer step 104. In a comparison step 106, the digital code values are compared to the digital aim code values, which have been calculated in the process shown in FIG. 3 and stored. If the values are unequal (decision step 108), the calibration process initiates an adjustment 110 of the digital telecine controls 62 (FIG. 2).

To perform the calibration, an experienced colorist (telecine operator) manipulates the telecine primary controls 62. The goal is to adjust the telecine data signal so as to achieve the aim output code values of each patch of the calibration film element 80. There are a number of parameters to change on the telecine device to achieve this goal, including one or more of the following adjustments:

a. Light level of the light source 45 may be adjusted to accommodate the D-min and the D-max of the calibration film element 80.

b. The 3×3 Masking matrix for the film type. This is the matrix in the telecine hardware that corrects for crosstalk in order to obtain a channel independent representation of the color dyes in the film element.

c. Matching blacks, i.e., setting RGB levels to obtain a desired black.

d. Matching whites, i.e., setting RGB levels to obtain a desired white.

e. CRT gamma off/on.

f. Lift, i.e., adjusting detail in the black areas.

g. Gamma, i.e., adjusting contrast in the mid-tone areas.

h. Gain, i.e., adjusting brightness in the highlight areas.

i. Data output lookup table in the Telecine, i.e., adjusting a LUT in the output data stream that can modify the output signal (could be a unity matrix).

j. Offsets in the RGB output.

Each of these adjustments are conventional adjustments available on a telecine or a data telecine, such as the Spirit DataCine™ available from Thomson, and would be familiar to a colorist of ordinary skill in the art.

After the telecine control adjustments are made, the scan of the calibration film element 80 is repeated in the scanning step 102 and the subsequent process is repeated until the obtained code values (from the scan) are found to be equal (step 108) to the aim code values. Then the telecine control setups are saved in the storage step 112 and telecine transfer of a filmstock may commence. Each film type potentially requires a different calibration setup (assuming each film type has different film characteristics) that is stored and retrieved when that film type is being run on the telecine. In practice, the resulting plurality of calibration setups (at least one for every film type) can easily be managed by using metadata in the form of KeyKode (which are computer readable markings provided on the film that specifies the film type) to select the proper setup.

The principal reason for this type of calibration is that film scenes that are subsequently scanned with the telecine set up in this manner may be directly written to film to produce a match to the original film element, and in particular without any other postproduction processing required in order to obtain such a match. Moreover, the scanning may be accomplished without requiring the colorist to constantly be making color grading decisions. The scanned data, however, would not be suitable for direct viewing on the monitor 30 (FIG. 1) as in the normal video mode. It has been found that a reasonable representation can be viewed on a system, such as the Cineon™ system offered by Eastman Kodak Company, with a film-calibrated monitor.

The benefit of this invention is that a postproduction facility could have a single (or few) telecine devices which could scan very fast, without making color grading decisions, and the resulting data could go a disk-to-disk final color grading at a later time, and even at alternative sites. This procedure also lowers the effective transfer time, which minimizes the potential problem of dirt collection during transfer. Dirt removal from digital data elements is costly in time and money. The saving of time, money, flexibility and accuracy to film is unprecedented in motion picture postproduction.

The invention has been described with reference to a preferred embodiment. However, it will be appreciated that variations and modifications can be effected by a person of ordinary skill in the art without departing from the scope of the invention.

PARTS LIST 10 camera exposure operation
12 camera negative
14 interpositive
16 photographic film element
18 optical printing process 20 telecine scanning process
22 release print
24 duplicate negative
26 optical printing process
28 release print
30 monitor
32 video recording stage
34 film recording stage
36 negative
38 1D LUTs
40 film transport
41 motion picture film
42 film gate
43 supply reel
44 take up reel
45 light source
46 circle to line converter
47 objective lens
48 beam splitter
49 unsharp color sensor
50 high resolution luminance sensor
51 sensor clock generator
52 A/D converter
53 A/D converter
54 color registration circuit
56 color interpolation circuit
58 detail extraction circuit
60 detail addition circuit
61 digital processor
62 telecine controls
63 light source controller
64 image store
64a first framestore
64b second framestore
64c interlace controller
66 data interface
80 calibration film element
82 patches
90 measurement step
92 printing density aim calculation step
94 conversion step
96 storage step
100 loading step
102 scanning step
104 transfer step
106 comparison step
108 decision step
110 telecine controls adjustment step
112 storage step

What is claimed is:

1. A method of transferring an image recorded on a photographic film to a digital signal by using a film scanning device that generates scan data representative of the digital signal, said method comprising the steps of:
   a) calibrating the film scanning device in relation to printing densities;
   b) scanning the photographic film with the film scanning device to produce scan data that represents printing densities; and
   c) driving a film recorder that exposes an output film with the digital signal, wherein the output film is subsequently printed onto a target print material, and the scan data, when written out to the film recorder, produces printing densities of the output film onto the target print material that are identical to the printing densities of the same photographic film optically transferred onto the target print material.

2. The method of transferring an image recorded on a photographic film to a digital signal claimed in claim 1, wherein the the film scanning device generates code values representative of the digital signal during scanning of the photographic fill.

3. The method as claimed in claim 2, wherein for the step of driving the film recorder that exposes an output film that is subsequently printed onto the target print material, said code values represent printing densities, which when written out to the film recorder produce printing densities of the output film onto the target print material that are identical to the printing densities of the same photographic film optically transferred onto the target print material.

4. The method as claimed in claim 1, wherein the photographic film is either a camera negative film or an intermediate film obtained from the camera negative film.

5. The method claimed in claim 1, wherein the transferred image is calibrated to provide an effect equivalent to that of optically exposing the photographic film onto the target print material, said method further comprising the steps of:
   calibrating the film scanner with respect to printing density such that the code values represent density values which when written out to an output film produces printing densities of the output film as subsequently printed onto the target print material that are identical to the printing densities of the same photographic film optically transferred onto the target print material;
   using the calibrated film scanner to effect transfer of the photographic film to the digital signal; and
   storing the digital signal for subsequent recording on the output film, whereby the stored digital signal as subsequently printed out to the output film captures substantially the full content of the image densities on the photographic film.

6. A method of calibrating a film scanning device in relation to printing densities of an output film printed onto a target print material, said method comprising the steps of:
   measuring a film calibration element with the film scanning device and producing scan measurements therefrom, said film calibration element including an ordered series of neutral exposures representing substantially the full exposure range of a particular film type;
   comparing the scan measurements to aim values derived from the film calibration element, said aim values representing printing densities which when written out by a film recorder produces printing densities of the output film onto the target print material that are identical to the printing densities of the same film calibration element optically transferred onto the target print material; and
   adjusting the film scanning device until the scan measurements substantially agree with the aim values.

7. The method as claimed in claim 6 wherein the step of adjusting the film scanning device produces one or more telecine setup values and the method further comprises the step of saving the setup values.

8. A method of transferring a motion picture film to a digital signal by using a telecine scanning device that generates scan data representative of the digital signal, said method comprising the steps of calibrating the telecine scanning device in relation to printing densities and then continuously scanning the motion picture film with the telecine scanning device to produce scan data that represents printing densities, whereby the transfer occurs continuously without interruption for scene-to-scene- color grading.

9. The method as claimed in claim 8 wherein the digital signal is used to drive a motion picture film recorder that exposes an output motion picture film that is subsequently printed onto a target motion picture print material, said scan data representing printing densities which when written out to the motion picture film recorder produces printing densities of the output motion picture film onto the target motion picture print material that are identical to the printing densities of the same motion picture film optically transferred onto the target motion picture print material.

10. The method as claimed in claim 8 further comprising the steps of storing the scan data and subsequently color grading the scan data as required.

11. In a system for transferring an image recorded on a photographic film to a digital signal using a film scanning device and subsequently writing the digital signals onto an output film that is printed onto a print material, the improvement wherein the film scanning device is calibrated to provide an effect equivalent to that of optically exposing the photographic film onto a print material, said system comprising:

a calibration element including an ordered series of neutral density exposures representing substantially the full exposure range of a particular film type;

a digital processing stage utilizing the calibration element for calibrating the film scanning device with respect to aim values representing printing densities and generated calibrated scan settings therefrom, wherein code values subsequently produced by the film scanning device represents density values which when written out to the output film produces printing densities of the output film as subsequently printed onto the print material that are identical to the printing densities of the same photographic film optically transferred onto the print material; and a film scanning stage using the calibrated settings to effect transfer of the photographic film to the digital signal.

12. The system as claimed in claim 11 further comprising a storage device for storing the digital signal.

13. The system as claimed in claim 12 wherein the stored digital signal is used for subsequent recording on the output film, whereby the stored digital signal as subsequently printed out to the output film captures substantially the full content of the image densities on the photographic film.

* * * * *

UNITED STATES PATENT AND TRADEMARK OFFICE
CERTIFICATE OF CORRECTION

PATENT NO. : 7,167,280 B2  Page 1 of 1
APPLICATION NO. : 10/040219
DATED : January 23, 2007
INVENTOR(S) : Mitchell J. Bogdanowicz et al.

It is certified that error appears in the above-identified patent and that said Letters Patent is hereby corrected as shown below:

Column 10, line 3    Before "film" delete "the"

Column 10, line 5    Delete "fill" and insert -- film --.

Signed and Sealed this

Seventh Day of August, 2007

JON W. DUDAS
*Director of the United States Patent and Trademark Office*